(12) United States Patent
Rubin et al.

(10) Patent No.: US 9,355,561 B2
(45) Date of Patent: May 31, 2016

(54) V2V SAFETY SYSTEM USING CONSENSUS

(71) Applicants: Kim Rubin, Menlo Park, CA (US); Joe Betts-Lacroix, Belmont, CA (US)

(72) Inventors: Kim Rubin, Menlo Park, CA (US); Joe Betts-Lacroix, Belmont, CA (US)

(73) Assignee: Zetta Research and Development LLC—ForC Series, Wilmington, DE (US)

( * ) Notice: Subject to any disclaimer, the term of this patent is extended or adjusted under 35 U.S.C. 154(b) by 0 days.

(21) Appl. No.: 14/395,764

(22) PCT Filed: Apr. 24, 2013

(86) PCT No.: PCT/US2013/038014
§ 371 (c)(1),
(2) Date: Oct. 20, 2014

(87) PCT Pub. No.: WO2013/163310
PCT Pub. Date: Oct. 31, 2013

(65) Prior Publication Data
US 2015/0146605 A1 May 28, 2015

Related U.S. Application Data

(60) Provisional application No. 61/637,588, filed on Apr. 24, 2012.

(51) Int. Cl.
*H04H 20/71* (2008.01)
*G08G 1/0967* (2006.01)
(Continued)

(52) U.S. Cl.
CPC .......... *G08G 1/096791* (2013.01); *G01C 21/26* (2013.01); *G01C 21/3658* (2013.01); *G08G 1/09* (2013.01); *G08G 1/0969* (2013.01); *G08G 1/142* (2013.01); *G08G 1/16* (2013.01); *G08G 1/161* (2013.01); *G08G 1/163* (2013.01);
(Continued)

(58) Field of Classification Search
CPC ... G08G 1/096791; G08G 1/09; G08G 1/142; G08G 1/161; G08G 1/20; G08G 1/0969; G08G 1/163; G08G 1/166; G08G 1/167; G08G 1/16; H04W 4/046; H04W 4/06; H04W 72/0446; H04W 72/005; H04W 74/0816; H04W 76/002; H04W 76/023; G01C 21/26; G01C 21/3658; H04J 3/1694; H04L 5/0091
See application file for complete search history.

(56) References Cited

U.S. PATENT DOCUMENTS 6,370,475 B1 * 4/2002 Breed ................... B60N 2/2863
340/436
6,526,352 B1 * 2/2003 Breed ................ G01C 21/3697
342/357.31

(Continued)

*Primary Examiner* — Kevin Mew
(74) *Attorney, Agent, or Firm* — Kim Rubin Patent Agent

(57) ABSTRACT

A vehicle-to-vehicle (V2V) communication system, method and transponder for use in V2V communication, safety and anti-collision systems uses a continual, iterative consensus algorithm involving a consensus subset of vehicles within a communication range. The consensus set of vehicles participating in the consensus algorithm may not be the same. The algorithm comprises determining a parameter value used by the vehicles in the consensus set, then averaging, with modifications and rate of change limitations, the values from the consensus set for next use by each transponder. Parameters include two axis of location, elevation, transmit power and time base. Transmit power is responsive to demand and range. Methods of obtaining the as-used values include using equations and ranges. Embodiments include a hybrid protocol using both TDMA and CSMA. The invention is free of both central authority and road-side equipment (RSU).

18 Claims, 6 Drawing Sheets

(51) Int. Cl.
*G08G 9/02* (2006.01)
*G08G 1/09* (2006.01)
*G08G 1/14* (2006.01)
*G08G 1/16* (2006.01)
*H04W 4/04* (2009.01)
*H04W 4/06* (2009.01)
*G01C 21/26* (2006.01)
*G01C 21/36* (2006.01)
*G08G 1/0969* (2006.01)
*H04J 3/16* (2006.01)
*H04L 5/00* (2006.01)
*H04W 72/04* (2009.01)
*H04W 74/08* (2009.01)
*H04W 72/00* (2009.01)
*H04W 64/00* (2009.01)
*H04W 76/00* (2009.01)
*H04W 76/02* (2009.01)
*B60R 25/33* (2013.01)
*G01S 5/00* (2006.01)
*G08G 1/00* (2006.01)
*B60W 10/06* (2006.01)
*B60W 10/18* (2012.01)
*B60W 10/20* (2006.01)
*B60W 50/14* (2012.01)

(52) U.S. Cl.
CPC .............. *G08G 1/166* (2013.01); *G08G 1/167* (2013.01); *G08G 9/02* (2013.01); *H04J 3/1694* (2013.01); *H04L 5/0091* (2013.01); *H04W 4/046* (2013.01); *H04W 4/06* (2013.01); *H04W 72/005* (2013.01); *H04W 72/0446* (2013.01); *H04W 74/0816* (2013.01); *B60R 25/33* (2013.01); *B60R 2325/205* (2013.01); *B60W 10/06* (2013.01); *B60W 10/18* (2013.01); *B60W 10/20* (2013.01); *B60W 50/14* (2013.01); *B60W 2550/402* (2013.01); *G01S 5/0027* (2013.01); *G08G 1/20* (2013.01); *H04W 64/006* (2013.01); *H04W 76/002* (2013.01); *H04W 76/023* (2013.01)

(56) References Cited

U.S. PATENT DOCUMENTS

| | | | | |
|---|---|---|---|---|
| 8,520,695 | B1* | 8/2013 | Rubin | G08G 9/02 370/337 |
| 9,253,753 | B2* | 2/2016 | Rubin | H04W 72/005 |
| 2005/0134440 | A1* | 6/2005 | Breed | B60N 2/2863 340/435 |
| 2007/0005609 | A1* | 1/2007 | Breed | B60N 2/2863 |
| 2007/0021915 | A1* | 1/2007 | Breed | B60N 2/2863 701/301 |
| 2009/0115638 | A1* | 5/2009 | Shankwitz | G01C 21/26 340/988 |
| 2011/0098877 | A1* | 4/2011 | Stahlin | G08G 1/161 701/31.4 |
| 2013/0279392 | A1* | 10/2013 | Rubin | H04W 72/005 370/312 |
| 2013/0279393 | A1* | 10/2013 | Rubin | H04J 3/1694 370/312 |
| 2013/0279491 | A1* | 10/2013 | Rubin | G08G 1/166 370/347 |

* cited by examiner

Fig. 3A
Fig. 3B
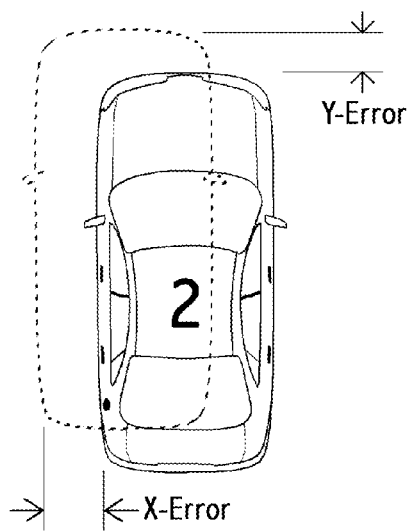
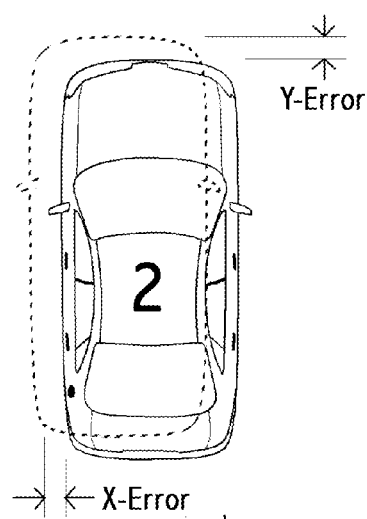
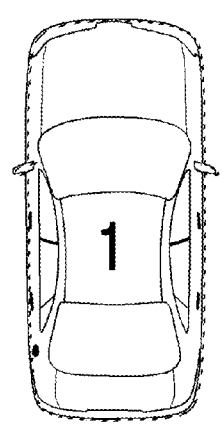
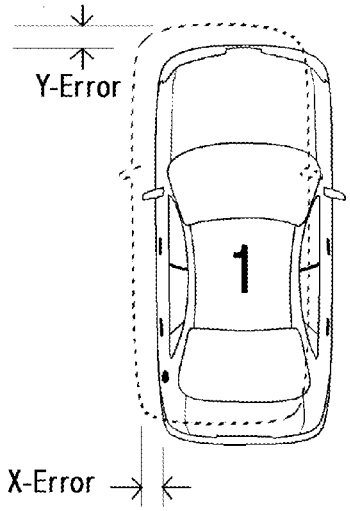

Fig. 5

$$E_0' = \frac{kE_0 + \sum_{m=1}^{M} E_m}{k + M + U}$$

V2V SAFETY SYSTEM USING CONSENSUS

TECHNICAL FIELD

The technical field of this invention is vehicle-to-vehicle (V2V) communication, safety, and anti-collision systems. The technical field is also consensus based parameter determination, and convergence of feedback-based iterative algorithms.

BACKGROUND ART

Background art includes wireless communications protocols, including IEEE 802.11, using CSMA and wireless systems using TDMA, such as the Automatic Identification System (AIS). Some systems require a central authority, hierarchical architecture or road-side equipment (RSU). Many systems use GPS or another satellite navigations system to provide geographical location and timing. Some systems use inertial navigation to provide or supplement geographical location. Some system use maps to provide or supplement geographical location. Some systems are completely self-configuring or "ad hoc." Nearly all prior art intended for V2V use includes permanent vehicle identification, and nearly all use IP address and MAC addresses. Background art suffers from: (i) insufficient bandwidth to handle the necessary number of vehicle in a V2V system, (ii) incomplete specifications such that enablement does not exist, (iii) non-real time operation which fundamentally fails to provide the purpose of a V2V anti-collision system, which is to prevent collisions, (iv) inconsistent or unreliable performance, (v) a design which requires 90% of vehicles to be equipped for reasonable system-level performance, and (vi) insufficient accuracy, particularly relative accuracy for reasonable system-level performance.

Background patents and patent applications include:
US 2012/0028862, published Feb. 2, 2012, by Nagai, Makoto, et al.;
U.S. Pat. No. 7,979,198-B1, published Jul. 12, 2011, by Kim et al.;
U.S. Pat. No. 7,236,878-B2, published Mar. 24, 2005, by Watanabe, Hisauyuki;
U.S. Pat. No. 5,506,587-A, published Feb. 21, 1993, by LANS, HÅKAN;
U.S. Pat. No. 35,660,404, published Feb. 23, 1971, by Sorkin;
U.S. Pat. No. 6,765,495-B1, published Jul. 20, 2004, by Dunning, et al.;
US 2005/0886318A1, published Apr. 28, 2005, by Liu, Jie;
US 2012/0268295A1, published Oct. 25, 2012, by Yuse, Yoshio;
U.S. Pat. No. 7,840,331, published May 8, 2008, by Yoshioka, Mototaka;
US 2012/0120883, published May 17, 2012, by Chen, Chung-Min, et al.;
US 2008/0095163-A1, published Apr. 24, 2008, by Wai Chen, et al.

Non-patent background literature includes:
FELIX SCHMIDT-EISENLOHR; Interference in Vehicle-to-Vehicle Communication Networks; Feb. 9, 2010; KIT Scientific Publishing; Karlsruhe, Germany; FIGS. 6.3 & 6.6;
KARAGIANNIS, GEORGIOS; Vehicular Networking: A Survey and Tutorial, Feb. 11, 2010; IEEE Communications Surveys;
ON THE ABILITY OF IEEE 802.11P AND STDMA TO PROVIDE PREDICTABLE CHANNEL ACCESS; Bilstrup, Katrin, et al. 2009; Centre for Research on Embedded Systems, Lamstad University, Sweden;
TECHNICAL CHARACTERISTICS AUTOMATIC IDENTIFICATION SYSTEM MARITIME; Intl Telecom Union; 04-2010; Recommendation ITU-R M.1271-4; Geneva.

Priority is claimed to:
U.S. application Ser. No. 13/852,200, filed 28 Mar. 2013, with priority to U.S. application Ser. No. 13/557,711 filed 25 Jul. 2012, with priority to U.S. Provisional Appl. No. 61/637,588, filed 24 Apr. 2012;
U.S. application Ser. No. 13/559,493, filed 26 Jul. 2012, with priority to U.S. Provisional Appl. No. 61/637,588, filed 24 Apr. 2012;
U.S. application Ser. No. 13/557,805, filed 25 Jul. 2012, with priority to U.S. Provisional Appl. No. 61/637,588, filed 24 Apr. 2012;
U.S. Provisional Appl. No. 61/637,588, filed 24 Apr. 2012.

DISCLOSURE OF THE INVENTION

In various embodiments, this invention is a comprehensive, usable system that will actually function in a real-world V2V environment by overcoming the above-stated weaknesses of the prior art.

The essence of the V2V safety system is the regular broadcast, by all equipped vehicles of a vehicle "core data" time-critical, safety message, comprising the vehicle's position, heading and speed, in a self-selected time slot in a repeating, fixed-time frame, or "basic time interval." Core data may be transmitted 10 times per second. In some frames, the transponder's time slot may be used for a different V2V safety message than core data, or, a higher density modulation may be used to provide core data and other data in the same message, still within one time slot.

An effective V2V system requires accurate relative position between vehicles. Such an accuracy may be on the order of 10 cm. Accuracy of GPS is on the order of 5 meters, and thus, by itself, is grossly deficient for this purpose. In one embodiment of this invention, location consensus is used to "offset" or add an "error" to broadcast vehicle locations, using an iterative process, typically once per frame, so that all or most nearby vehicles' broadcast location data converges in that their relative broadcast locations are close to their actual relative locations. In addition, the process converges on the average of the vehicle's "baseline" location. Baseline location may be determined by a combination of GPS, inertial guidance, and other sources. The consensus process, in one embodiment, effectively averages the location errors of nearby vehicles. Since all vehicles in a consensus set participate in the process, their errors from true location are averaged for the set.

In one embodiment, two axes of location are converged separately. The axes for the convergence algorithm may not be the same axes used to encode broadcast location. For example, axes used on the convergence process may be the road axis, and perpendicular to the road axis, where the broadcast positions may use N-S and E-W as the axes. Not all vehicles in the consensus set need to use the same axes for their computations.

Other critical parameters suitable for improving by embodiments include: elevation offset, transmit power and time base offset. Converging on a nearly common transmit power for a set of vehicles in a range set (vehicles currently communicating) is critical so that two vehicles transmitting also, generally, receive each other messages. This is particularly critical for message collision messages. Power convergence significantly reduces the "hidden node" problem of shared radio media networks.

A unique aspect of these embodiments is that the range set, and thus, likely the consensus set of each vehicle is different. Thus, the averaged values across a given consensus set are likely to be different. This means that the consensus value along a long street of vehicles may smoothly change from one end of the street to the other; yet, each vehicle will have a parameter value very close to the same value as its neighboring vehicles.

Another unique aspect of these embodiments is that the algorithm runs continually, and thus never truly converges, as the vehicles are constantly entering and leaving the consensus set each iteration.

Generally, as each vehicle re-computes the consensus parameter, there is also a rate of change limitation imposed to avoid the appearance of artifacts in the transmissions and to create non-oscillatory convergence.

The averaging may also use non-uniform weighting, and also a convergence rate factor, may include a zero or baseline value, and may include a factor to encourage convergence towards zero.

Another parameter that is set by consensus, in one embodiment, is transmit power. A range set of vehicles should, in general, use the lowest power to reach the desired operating range, yet enough power to reach, reliably, all vehicles that could potentially be involved in a collision or a safety decision or for traffic optimization. The two factors that determine idea power is the distance in the range set and the number of time slots in use. Keeping the number of time slots in the priority class region down to a minimum provides more available bandwidth the non-priority class region for a wider range of convenience messages. Each vehicle provides its own computed, "ideal" or "requested" power for its range set, for each class region in which it is operating. Each vehicle in the range set averages the requested power levels, then sets its own power to this level, subject to some constraints, such as ramp up and ramp down rate, and special message types. Note that, like above, since range sets overlap, vehicles within a range set or consensus set do not necessarily have the same power level. Power levels may thus shift gradually from a high-density, low-power road region to a low-density, high power road region.

BRIEF DESCRIPTION OF DRAWINGS

FIG. 3 shows an embodiment of one cycle of location consensus.

FIG. 5 shows an embodiment of an equation for consensus.

BEST MODE FOR CARRYING OUT THE INVENTION

Figure 1:
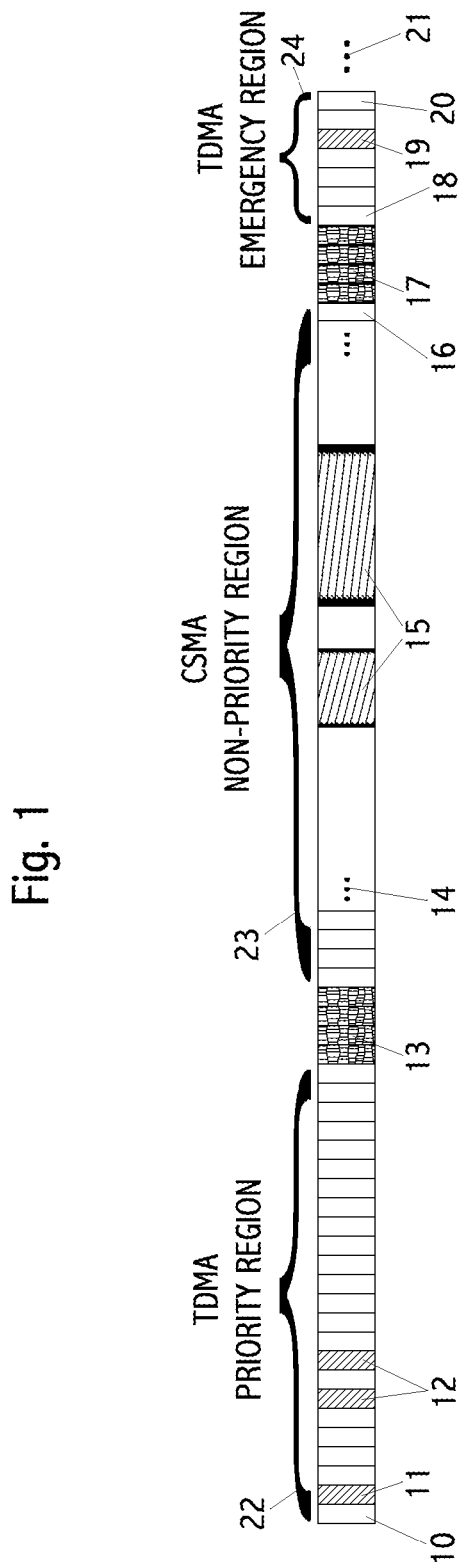
FIG. 1 shows one exemplary frame, time slots, and three class regions.

One, non-limiting scenario is described below:

Some vehicles are equipped with a transponder ("equipped vehicle"), some are not ("non-equipped vehicles.") Each second is divided into TDMA frames for 100 ms; each TDMA frame is divided into 1000, 100 μs time slots. The frames, or "basic time intervals," are subdivided into three dynamically-sized "class regions," a first class region, "priority," which starts at time slot 1, a second class region, "non-priority", and a third class region, "emergency" ending at time slot 1000. The priority and emergency class regions are similar, handling time-critical messages only, using TDMA protocol. The priority class region is for most vehicles, with the emergency class region reserved for emergency vehicles and government authorized road-size equipment (RSU). The priority class expands and contracts upward starting at time slot 1. The emergency class expands and contracts downward, starting at time slot 1000. The non-emergency class is all left over time slots, not in the other two class regions or in a buffer zone. The non-priority class region is managed in a modified CSMA protocol; it handles longer messages and non-time-critical messages. The CSMA protocol is modified because messages may not overlap into the priority and emergency class regions, and messages broken into multiple frames are preferentially transmitted starting at the same time slot in each frame. Different priorities within the non-priority class region may use different back-off times an other different parameters based on the message priority.

We discuss the priority class region. Protocol for the emergency class region is similar, except for the above stated restrictions, and different parameters.

Priority class messages are nearly all fixed length, the length being one time-slot. Messages with more data are encoded using a higher-density encoding. A transponder self-selects a time slot, then keeps that same time slot until a reselection condition. The transponder transmits in its selected time slot in every frame, which "holds" that time slot so that another transceiver does not select it. A reselection condition is either (1) a message collision in that time slot, or (2) a time slot holding timer expires, combined with other conditions. When a transponder selects a new time slot it chooses, using a weighted random function, from the set of available time slots in its priority class.

All transponders participate in identifying message collisions—that is, two or more transponders transmitting in the same time slot within a communication range. Any transponder detection a message collision sends a message collision notification message, unless a similar message has already been sent.

The size of the priority class region is dynamic, changing each frame based on how busy that class region is. The size of the class region is the larger of (1) the highest numbered time slot in use in the region, or (2) a size set to keep the number of available time slots at or above a threshold. The weighted time slot selection functions causes selected time slots to statistically "clump" near 1, keeping the size of the priority class region as small as possible. The reselection time-out causes transponders with a high time slot number to eventually select a likely lower time slot number, keeping the priority class region as small as possible. One embodiment provides that there is always a minimum of 100 empty or available time slots in the priority class region, subject to the total available time slots in the frame.

Ideally, most of the time, the priority and emergency class regions are small, providing most of the time slots, and thus most of the available bandwidth available in the non-priority class region for a wide variety of messages, including courtesy messages, data update messages (e.g., lane maps and lane history), and social messages. If necessary, the priority and emergency class regions will expand to consume the entire frame, permitting up to 1000 time-critical messages to be sent ten times per second.

A targeted range for an effective communication range is 1 km. A targeted number of vehicles in a range set is up to 250.

A basic V2V safety message transmitted in the priority class region comprises (i) vehicle position, (ii) vehicle heading, and (iii) vehicle speed. It may also comprise a vehicle type code. It may also comprise a collision risk value and a collision type. It may comprise sub-messages, wherein a wide variety of sub-messages are defined. It may include elevation.

The vehicle position, heading and speed are compressed in a novel format that uses very few bits, keeping the messages size small, and thus permitting a highly reliable encoding. Vehicle position is sent as an offset from a nearby point on a predefined grid, such as every ½ degree of latitude and longitude. A predefined set of elevations, such as every 100 meters, is also used, wherein an offset from the nearest elevation in the set is used to communicate a particular elevation.

IP address, MAC addresses and pre-assigned vehicle identifiers are not generally used. Vehicles are tracked solely by their position (unless still or video images are used to link a vehicle location to license plate or other permanent identification). This dramatically reduces the size of messages. An occasional (sent every 1 to 5 seconds) "linking" message in the non-priority class region may be used to link the regular V2V safety messages to a pre-assigned permanent vehicle identification.

Nearly all priority messages are broadcast in clear text. PKI, encryption, and digital certificates may be used for messages in the non-priority class region. Vehicles may be identified either by (1) their location, or (2) their time slot.

Because the communication range for priority messages is short, such as 1 km, the inter-frame gap may be short, such as 4 μs. Power is adjusted dynamically so that vehicles outside the range set do not interfere. The range, and the inter-frame gap, may be different for each of the three class regions. Thus, the emergency and non-priority class regions may have a significantly longer range.

A buffer zone of time slots may be used between the three class regions, such as 10 to 100 time slots, to enable rapid expansion of the priority and emergency class regions. The priority and emergency class regions may have a minimum size, such as 10 to 250 time slots.

A unique feature of embodiment is "proxying," whereby an equipped vehicle sends messages on behalf of a nearby non-equipped vehicle. A proxy hand-off is described. This embodiment permits effective operation a V2V anti-collision system with as little as 10% of all vehicles being equipped.

A unique feature of embodiments is that no central authority is required. A system of deployed transponders is entirely self-sufficient. No government or cloud-based entity is required; no RSU is required; no IP addressing is required; no IP address assignment source is required; and no certificate authority is required.

The TDMA frame may be from 1 ms to 5000 ms; 100 ms is preferred. The number of time slots in a frame may be 10 to 10,000; 1000 time slots are preferred. Various wireless frequencies are possible, with government allocated frequencies for vehicle safety communications are preferred, such as are listed in IEEE 802.11p. Various modulations are possible, but the modulations as described in IEEE 802.11p are preferred.

The CSMA protocols of IEEE 802.11 are not effective for V2V safety applications. Thus, embodiments use a TDMA protocol, instead, with the TDMA frame divided into two or more class regions, as described above, with or without buffer regions between the class regions. One class region, the non-priority class region, uses a modified CSMA protocol to permit longer and non-time-critical messages, as compared to the priority and emergency class regions.

Fixed equipment, such as road-side unit (RSU) to vehicle communication is sometimes called X2V, or V2X. We use V2V to encompass all variations, including X2V, V2X, and defining cars, trucks, busses, trains, pedestrians, animals, moving sports equipment, construction equipment, fixed or temporary road hazards, government transponders, robots, automated vehicles and drones as "vehicles."

Collision prevention also includes collision mitigation and behavior modification that improves safety and safety margins, whether the vehicle behavior modification is automatic or human mediated.

A vehicle is "equipped" when it comprises a properly operating transponder sending valid V2V safety messages regarding a vehicle. An equipped vehicle may "proxy" for another, non-equipped vehicle, by sending data for the non-equipped vehicle on its behalf. In most case, "the vehicle" is either the equipped vehicle in which the transponder is located, or the non-equipped vehicle being proxied. Ideally, a single bit in the core safety message identifies if the message is a proxy message. A transponder may function as multiple transponders; for example, it may be sending messages for its host vehicles and two other, proxied vehicles; in this case, it acts as three separate transponders.

A transponder needs to know a vehicle's position, heading and speed. Typically, a mix of a global positing satellite receiver (such as GPS, or another system) and inertial navigation are used, often with other sensors or other data, to determine the "believed," "best computed" or baseline geographical position, heading, and speed. An electronic compass, magnetometer, accelerometer, motion sensor, or video inputs may be used. The actual transmitted position is compressed data, ideally an offset from a predetermined geographical grid. In addition, the transmitted position may be modified from the baseline position by a vector offset as part of "location consensus algorithm."

In one embodiment, a priority class region starts at frame 1 and grows upward based on demand; there may be a minimum size in the range of 10 to 500 time slots, such as 100 time slots. An emergency class regions starts at frame 1000 and grown downward based on demand; there may be a minimum size in the range of 10 to 100 time slots, such as 25 time slots. The emergency class region may be reserved for emergency vehicles, government authorized road-side equipment (RSU), or both. The priority class region is reserved for time-critical V2V safety messages; transponders should ideally self-select a single time slot in this class region and transmit a message in that time slot in every frame until a new time slot selection condition is met. However, a transponder occasionally not transmitting in a frame, or occasionally transmitting in a second time slot is still within the scope of claimed embodiments. Transponders should transmit in their selected time slot every frame, or at least in 50% of all frames.

The priority class region may be defined from time slot S1 to time slot S2. For example, S1 may be 1 and S2 may be 100. The non-priority class region may be defined from S3 to S4. For example, S3 may be 126 and S4 is 900. The class regions should not overlap, noting that short term, small overlaps have a negligible effect on the overall effectiveness of the V2V safety system of this invention and are considered within the claimed embodiments. The emergency class region may be defined from S5 to S6. For example, S5 may be 976 and S6 may be 1000. In these examples there is a 25 time slot buffer (101-125) and a 75 time slot buffer (901-975).

Core data messages (position, heading and speed), message collision messages, network error or hacking detection notification, and risk warnings above a risk threshold are all time-critical V2V safety messages. Generally, a transponder will send core message data in every frame. It will supplement this core message data with additional data, either time-critical or not time critical, as the need to send those messages arises. It may, for a period of one frame at a time, substitute a non-core-data message for a core data message, using the same time slot. Thus, up to every other frame may be non-core-data messages.

Additional data, beyond the core data, may be transmitted in the time window of one time frame by increasing the modulation complexity. Modulation may be selected on a per-message basis. Thus, it may change every time slot, every frame, or from one class regions to another.

Demand within a class region may be measured by the number of transponders using the class region, the number of vehicles with representative data in the class region, the number of used time slots, or the number of empty time slots in the class region. These various metrics vary slightly, but are functionally equivalent. An ideal metric is the number of empty or non-empty time slots in the current class region. An empty time slot is one that was sufficiently free from other transmission or noise that it is suitable and available for selection by a transponder, for the immediately prior frame, or for n consecutive immediately prior frames, where n is in the range of 1 to 10. Good choices for n are 1 or 2.

In one embodiment the size of the priority class region resets at the end of each frame such that the number of empty time slots is a constant, such as 100, subject to a first limitation that a currently used time slot in class region, for example, time slot 163, restricts downsizing the class region to exclude the used time slot, and a second limitation that the priority class region may not grow into the emergency class region.

Similarly the emergency class region size resets at the end of each frame such that the number of empty time slots is a constant, such as 25, and the class region may not downsize such that it excludes a currently used time slot in the region. The emergency class region may expand to every time slot in the frame, if necessary.

The non-priority class region, which is managed with a modified CSMA protocol, consists of the "left over" times slots in the frame not in the priority or emergency class regions, or in any buffer zones. This class region supports a wide range of message times, message lengths, priorities, and modulations. It may have a different range, power, and inter-transmission guard time than the other class regions. Transmissions in this class region may not overlap with the priority and emergency class regions. They may overlap with a buffer zone for no more than one frame, and may not overlap with a buffer zone during the first transmission of a chained, or multi-part transmission. Differing priorities within this class region should use different parameters, such as different waiting times and different back-off periods. A multi-part transmission should start at the same time slot in each frame, even if the initial transmit time was selected using CSMA. A transponder may not begin transmitting in the non-priority class region until it first determines that all time slots that will be used by the transmission are empty in the immediately prior (or n immediately prior) frames. All transmissions in the non-priority class region ideally begin on time-slot boundaries, although they may end on a non-boundary, based on the length of the message.

The size of the priority class and the emergency class regions should be adjusted after the end of every frame. They may be adjusted less often. If the priority class region begins at time slot S1 and ends at time slot S2, it consists of S2−S1+1 time slots. Some of these time slots are empty, as defined above. The remaining time slots are non-empty. A time slot "in use" means that that in the immediately prior (or in one of the n immediately prior) frames, a valid message was received in that time slot. A time slot maybe non-empty but not in use; for example, it may contain noise. An available time slot has to be empty and otherwise be suitable for selection as a time slot by a transponder. Some time slots may be reserved, or otherwise not available. For example, time slot 1 or 1000 may be reserved (to permit much long transmission distances for time slot 1000 or 999, for example).

Note that the range set or consensus set for each vehicle may be different, as each vehicle is in a different location and has slightly different communications hardware. Thus, the computed size of the class regions may be different for every vehicle in a particular range set. However, the sizes will not differ by much; and, for vehicles close together, the computed sizes of the class regions will be close. This is one reason for the buffer zones. Also, this is why "non-empty" is used in setting the maximum time slot number of the priority class region, rather than "in use."

Equipped vehicles should send a V2V safety message in the priority class region in every frame, if the vehicle is operating. A parked vehicle may or may not be operating. An operating emergency vehicle may stop sending in the emergency class region if it is no longer operating in an emergency mode. An emergency vehicle may send either emergency or non-emergency, priority messages in the priority class region. An emergency vehicle may send any type of message in the non-priority region, including emergency messages.

When adjusting the sizes of the class regions, the emergency class region is resized first, then the priority class region, then the non-priority class region. Thus, the non-priority class region gets the "left over" time slots, excluding any times slots in buffer regions or reserved time slots. Reserved time slots may be considered as a buffer region.

A message may consist of a Type 0 message, or may consist of one or more of sub-messages. Each sub-message has a non-zero Type number. Table I below shows the size of Type 0 and some sample sub-messages.

TABLE I

Message Sizes in Bits

| Field Name | Size | Type 0 | Header | Type 1 | Type 2 | Type 3 | Elevation |
|---|---|---|---|---|---|---|---|
| V2V revision level | 4 | 4 | 4 | | | | |
| Flags | 4 | 4 | 4 | | | | |
| Message size | 8 | 0 | 8 | | | | |
| Sub-message type | 6 | 0 | | 6 | 6 | 6 | 6 |
| Final risk | 4 | 4 | | 0 | 4 | 4 | 0 |
| Vehicle type | 6 | 6 | | 0 | 6 | 6 | 0 |
| Collision type | 4 | 4 | | 0 | 4 | 4 | 0 |
| Risk sources | 4 | 4 | | 0 | 4 | 4 | 0 |
| Offset N-S | 24 | 24 | | 24 | 0 | 24 | 0 |
| Offset E-W | 24 | 24 | | 24 | 0 | 24 | 0 |

TABLE I-continued

Message Sizes in Bits

| Field Name | Size | Type 0 | Header | Type 1 | Type 2 | Type 3 | Elevation |
|---|---|---|---|---|---|---|---|
| Angle of travel | 10 | 10 | | 10 | 0 | 0 | 0 |
| Speed of travel | 10 | 10 | | 10 | 0 | 0 | 0 |
| Lane type | 8 | 8 | | 0 | 8 | 8 | 0 |
| Risk type | 12 | 12 | | 0 | 12 | 12 | 0 |
| Elevation Offset | 0 | 0 | | 0 | 0 | 0 | 10 |
| Subtotal | 128 | 114 | 16 | 74 | 44 | 92 | 16 |

Field definitions follow. V2V revision level is a 4-bit field that defines the applicable level of features or Standards used by the transponder. A value of zero means that the message is a Type 0 message. The Flags field consists of four binary flags: emergency, final, forward, and proxy. The emergency flag is true if the message is transmitted by an emergency vehicle. The final flag is true if this message is the final frame of a "chained," or multi-part transmission, and true if the message is not a multi-part message. The forward flag is true if the message is a forwarded, rather than an original, message. The proxy flag is true of the message is a proxy message, meaning that vehicle described in the message is not the host vehicle for the transponder. The message size field is an 8 bit unsigned integer that is the number of 24-bit symbols in the message. The sub-message type is a 6-bit field identifying the type, and thus the length (which is fixed for each type of sub-message), of the sub-message. The final risk is a 4-bit field that contains the current computed risk value by the transponder. See the final risk table, elsewhere herein. The vehicle type is a 6-bit field that contains a vehicle type from a pre-determined vehicle type table. The collision type is a 4-bit value that contains a collision type from a pre-determined collision type table. The risk sources field is a 4-bit field comprising four flags to identify the primary reason or reasons for the final risk. These flags are: vehicle behavior, road and weather conditions, traffic, and location history. Vehicle behavior means that one or more vehicles are behaving in an unsafe say; road and weather conditions means that the road condition or weather conditions, such as an icy surface are unsafe; traffic means that the overall behavior of traffic is unsafe; location history means that the stored history of the current location is unsafe. The threshold of "safe" or "unsafe" for the four flags in this field depends, in part, on the final risk value. Offset N-S is a 24 bit signed integer that represents the number of cm on a N-S longitude line from the nearest or selected grid point. Offset E-W is a 24 bit signed integer that represents the number of cm on an E-W altitude line from the nearest or selected grid point. Note that the two Offset fields, as transmitted, may have additional offsets due to location consensus. The two Offset fields make up the vehicle position. They may be considered a vector from the nearest (or selected) pre-defined grid point to the reference location on the vehicle. This embodiment uses distance, which should be either straight line or on the surface of the earth at elevation of the vehicle. Other embodiments may use a unit in degrees, such a 0.1 seconds of arc. Angle of travel is a 10-bit field with an unsigned integer in the range of 0 to 1023, representing the 360° compass divided into 1024 equal headings, with true North being 0. The speed of travel field is an unsigned 10-bit integer that represents the forward speed of the subject vehicle in units of 0.1 m/s (about 0.2 mph), with an offset of 10 m/s. Thus the range of this field is −10 m/s (field value of 0) to +92.3 m/s (field value of 1023). A stopped vehicle uses a field value of 100. Speeds in the range of −10 m/s to −0.1 m/s represent a vehicle backing up. For a vehicle backing up at a speed greater than 10 m/s, the vehicle should be "turned around," that is, the reference point should be moved to the center of the back of the vehicle and the speed now encoded as positive. This field has an approximate range of −22 mph to 206 mph.

Embodiments of a geographical grid for use in transmitting Offsets from a grid point include any predefined set of grid points; grid points spaced at 2°, 1°, 0.5°, 0.25°, 0.1°, 0.025° for latitude or longitude or both, or any interval in the range of 0.01° to 5°. Either or both the geographic grid and the transmitted offsets may be in units of latitude, longitude, or distance, or any combination. Elevation may also be based on elevation intervals while transmitting only an offset from a predetermined interval. Elevation intervals may be 10, 50, 100, 200, 500, 1000 meters, or any interval between 1 and 1000 meters or between 1 and 1000 feet. Generally, a transponder should use the nearest grid point; however, it should not change a grid point abruptly when another grid point becomes closer. A transponder may change grid points when a majority of vehicles in its range set are using a different grid point. A transponder must determined which grid point, out of as many as four possible grid points, is being used for each received message with a position. Only one such grid point will generate a rational (near by) position.

The PLCC preamble, FCS, SIGNAL, and other parts and aspects of the transmission, including modulations, but excluding MAC and IP addresses, higher level protocol data, minimum message size and CSMA parameters, are defined by IEEE 802.11p.

A Type 0 message comprises core data, that is: vehicle position, heading and speed, in the fields Offset N-S, Offset E-W, Angle of travel, and speed of travel, as described above. A Type 0 message does not contain any sub-messages and does not contain a message size field. As can be seen from the above Table, this basic, short message contains a substantial amount of data relevant to prevent or mitigate vehicle collisions. If core data is combined with other sub-messages, a Type 1 sub-message may be used. Core data may also include the fields defined above for Type 0 messages.

Messages containing sub-messages contain a Header, shown in the above Table. The Header contains a Message size field, which indicates the number of 24-bit symbols in the message. Since each sub-message Type has is fixed length, it is easy to tell if a sub-message is the last sub-message, or if another sub-message follows. Following the Header are one or more sub-messages. Each sub-message begins with a 6-bit Sub-message type field. The Table above shows the fields used in four types of sub-messages: Type 1, Type 2, Type 3, and Null type. Type 1 sub-messages contain the core data of vehicle location, heading and speed. Type 2 sub-messages contain risk and vehicle type fields. Note that Type 1 and Type 2 sub-messages, together, have essentially the same information as a Type 0 message. Type 3 sub-messages are used to communicate a location of a risk that is not the location of the vehicle normally the subject of message of this transponder. It comprises a location, but no heading or speed. For example, it might be the point of expected impact, or a location of an icy patch on a road. The other fields in the Type 3 message provide more information about the nature of the specific risk at the included location in the sub-message. A Null Type is used for padding, if necessary. There are many other sub-messages types, some of which are discussed elsewhere, herein.

The reference point for the location of a vehicle is the intersection of the center-line of the vehicle and the perpendicular line that comprises the forward most point on the vehicle. The elevation of the reference point is the road surface.

Novel features of an embodiment include broadcasting some or all of the fields and flags described above for a Type 0 message in a regular TDMA V2V message, such as in at least 50% of all frames.

TABLE II

Collision Type Values and Meaning

| Value | Collision Type |
|---|---|
| 0 | No collision information in message |
| 1 | Rear-ender |
| 3 | Side-swipe |
| 4 | Head-on |
| 5 | Pedestrian, bicycle, or motorcycle |
| 6 | Multi-vehicle |
| 7 | Single-vehicle on roadway |
| 8 | Single-vehicle off roadway |
| 9-14 | reserved |
| 15 | unknown collision type |

Table II—Collision Type Values and Meaning, above, shows one embodiment of how collision types are coded in a 4-bit field. The collision types shown make up nearly vehicle collisions. For vehicle to know the potential or predicted (most likely) collision type is a significant advantage. Avoidance or mitigation actions vary significantly based on the type of collision to avoid.

FIG. 1 shows an exemplary frame, time slots and three class regions. This frame is 1000 time slots, starting with time slot 1, shown as reference designator 10, up through time slot 1000, shown as reference designator 20. The TDMA managed priority class region is shown with bracket 22 and comprises time slots 1 through 24. The CSMA managed non-priority class region is shown with bracket 23 and comprises time slots 29 through 989. The TDMA managed emergency class region is shown with bracket 24 and comprises time slots 994 through 1000. Two buffer zones between the CSMA and the TDMA regions are shown as 13 and 17. Each of these buffer zones is shown as four time slots in size. In the priority class region, three time slots are in use, shown as designators 11 and 12. These time slots are numbered 2, 7 and 9. Note that these three time slots are "clumped" near the time slot number 1 end of the priority class region. In the emergency class region, one time slot is in use, number 998, shown with designator 19. Designator 21 shows three dots indicating that the frames repeat continuously. The frame shown may be 0.1 ms in length, with 1000 time slots each 100 µs in length. In the CSMA managed non-priority region, two messages are shown, 15. Note that these messages are variable length and are longer than one time slot. Although there are time slots in the non-priority region, they are less important than in the TDMA managed regions, and are not shown in FIG. 1 except for four time slots at the beginning and one time slot at the end. Designator 14 shows with three dots how these time slots continue throughout the non-priority class region. Designator 16 shows the last time slot, number 989, of the non-priority region. Empty time slots are shown as white. Designator 18 shows time slot number 994, which may be considered the "last" time slot in the emergency class region (with the region "starting" with time slot number 1000, designator 20) as the emergency class region grows downward as demand in the region increases. As demand for the priority region increases, the border between the priority and non-priority regions moves upward, and thus the non-priority region become smaller. As demand for the emergency region increases, the border between the emergency and non-priority regions moves downward, and thus the non-priority region become smaller. The buffer zones are optional.

In FIG. 1, the priority class region is time slot numbers from S1 to S2, where S1 is 1 and S2 is 24. The non-priority class region is S3 to S4, where S3 is 29 and S4 is 989. The emergency class region is S5 to S6, where S5 is 994 and S6 is 1000. This embodiment may have a frame of 100 ms, with 1000, 100 µs time slots. Alternative time slot times are 500, 200 µs time slots, and 250, 400 µs time slots.

In FIG. 1, designator 15 shows two CSMA messages in the non-priority class region. Note that the time gap between the two messages is larger than the time width of one time slot, indicating an embodiment where the inter-message guard time (called the inter-frame time in IEEE 802) is larger in this class region than in the two TDMA regions. Transmit power and desired or effective communication range may be higher, too. Modulation may be different, as well; for example, it may be higher bit rate modulation to encode more data at the cost of lower reliability delivery of the non-critical message.

Figure 2:
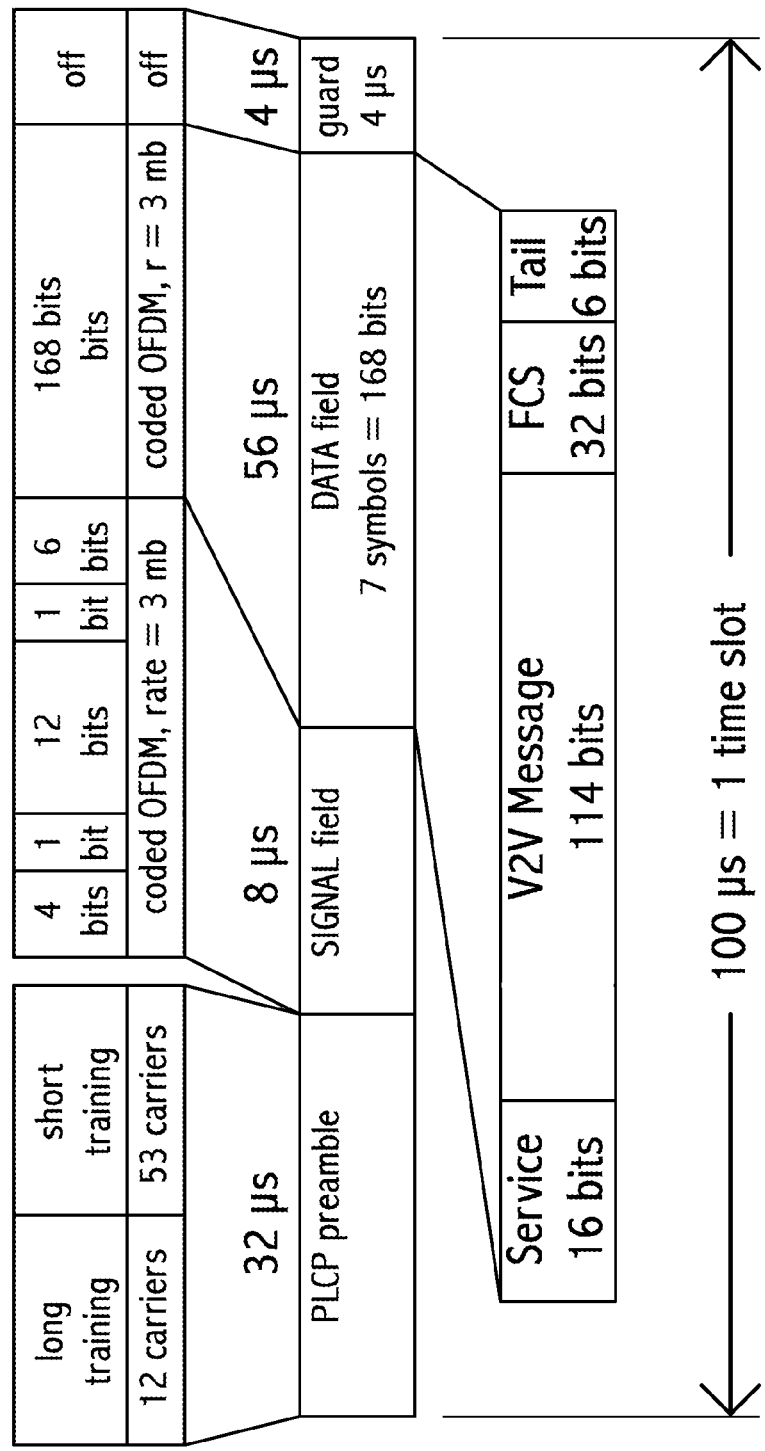
FIG. 2 shows a single 100 μs message frame in partial IEEE 802.11p format, with a 3 mbit/s modulation, comprising SIGNAL, SERVICE, FCS, and Tail fields, with 114 bits available for a V2V message.

FIG. 2 shows the field lengths and timing for message using 3 mbit/sec (mb/s) modulation for a 100 µs time slot, including a 4 µs guard time. The available time for V2V message data is 7, 24-bit symbols, including the SERVICE, FCS and tail bits, leaving 114 bits net for the message.

Using 6 mb/s modulation, the available time for V2V message data is 7, 48-bit symbols, leaving 282 bits net for the V2V message. Calculating net message length for this other modulations, other time slot lengths, and other guard times is done similarly to as shown in FIG. 2.

FIGS. 3A and 3B shows an overview of how location consensus works. In 8A, relative to vehicle 1, vehicle 2 has both an X-Error and a Y-Error. By comparing the difference in the broadcast location by vehicle 2 with the actual separation (as determined by using sensors on vehicle 1), the relative position of vehicle 2 to vehicle 1, the effective error in the position reference being used by vehicle 2 can be determined. This error is averaged for the consensus set of such determinable vehicles, including the host vehicle (vehicle 1), and this new average value is added to the host's positions as broadcast. Other vehicles in the consensus set execute the same averaging algorithm, with the result that all vehicles in the consensus set (here, vehicles 1 and 2) adjust their broadcast positions so that the relative positions of the vehicles match or is close to the actual separations, as determined by those of the vehicles' local sensors. This result is shown in FIG. 3B. The solid lines show the actual vehicle locations, and the dotted lines show the as-broadcast locations. In FIG. 3B, the difference between the solid-lined vehicles (actual) and the dotted-lined vehicles (as broadcast) are the same.

Figure 4:
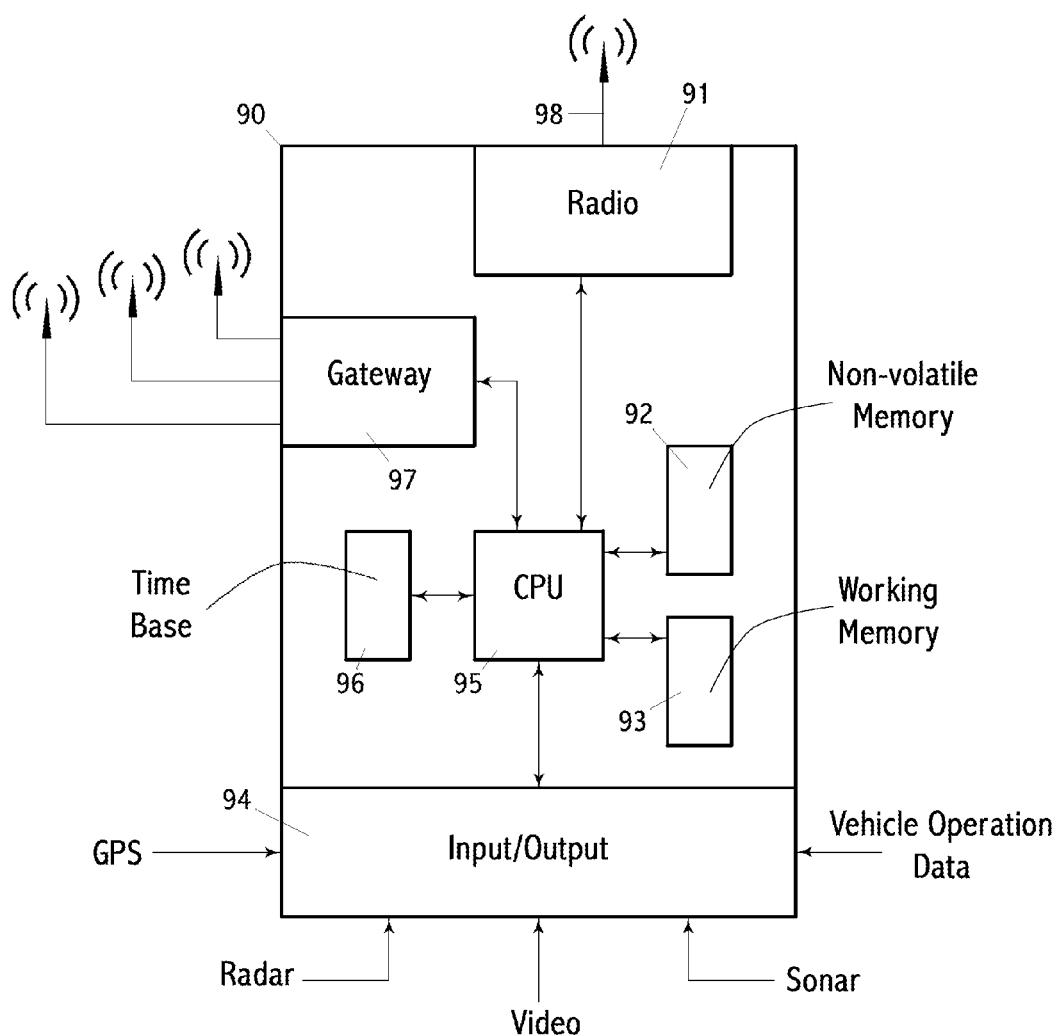
FIG. 4 shows a block diagram of an embodiment of a transponder.

FIG. 4 shows an embodiment of a block diagram of a V2V transponder, 90. 91 is the radio, which can send and receive in authorized V2V bands and modulations. 92 is non-volatile memory to hold lane records, road history, firmware, and the like. 93 is working memory, such as RAM. 95 is a CPU, processor, or a plurality of processors, include DSPs, for example. 96 is a time base, which may comprise a temperature compensated crystal oscillator with an accuracy of 2 parts in 10^13 per day, and accepts GPS or other satellite time as an input. 94 shows many input output capabilities, such as vehicle operation data (such as speed, heading, state of controls, braking, lights, etc.), sonar, radar and video for determining the relative position, heading and speed of nearby vehicles for location and elevation consensus, video or still input for security and road documentation, and GPS or another satellite system for course location and timing. This list is not exhaustive. A gateway, 97, may provide connectivity to other networks, such as WiFi, cellular phone and cellular data, Bluetooth, and the like. 98 is the V2V radio antenna.

Figure 5:
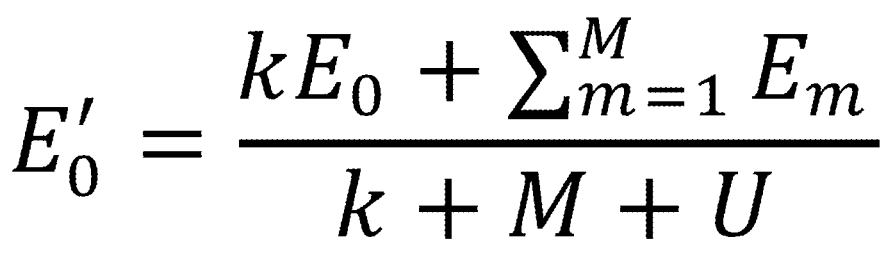

FIG. 5, we see an embodiment of a formula that may be used. This formula may be used for all embodiments, selecting the correct constants and variables in the equation for the desired parameter and as-used values upon which are to be converged. In some embodiments a baseline value is added into the numerator of the equation. K is often 1.

We describe now the use of the equation in FIG. 5 for time base convergence. Once the startup period has ended and at least one or two transceivers are being received. E0 is the time base offset of the transceiver. This may be viewed as a signed offset from the GPS clock, or preferably an offset from an internal time base based on an ovenized crystal oscillator that is synchronized over an appropriate period to a GPS (or other satellite system) clock. E0' is the next offset that is being computed, for example, for the next basic time interval. M is the number of valid receivers from whom a valid transmission in the current A or C (or both) time interval classes. Each Em is the time base offset for each respective received transmission, for m=1 through M. If more than one message has been received in a basic time interval from one transceiver, only one should be used. Em is determined from the transmission received. These Em are summed, along with E0, then averaged, by dividing by M+1, if k=1, to produce the true average of both the remote and the local as-used values. k is the weighting factor for the self (local) transponder. Typically k=1, but a higher k may be used to limit the rate of convergence towards the local as-used value. U is a weighting factor to drive the as-used value, which is an offset form the local clock, towards zero. If U=0, then the internal time base is not used, and the consensus set will converge on its own average. If U=1, then the offset from the local time base is weighted the same as for each remote each transceiver. U=1 is recommended. If U>1 then the internal time base is weighted higher. Since the Ex terms are all offsets, when E0=0 the as-used offset is zero and the as-used time base matches the internal time base exactly. If U<1, such as 0.1 or 0.01, then the internal time base will have a steady, but slow impact on the convergence. The choice of U depends on the amount of short term (up to a minute) variation or jitter there is in the internal time base. Generally, an internal clock, such as an OCXO (ovenized crystal oscillator) will have a much higher short-term accuracy than a received GPS signal. Suitable drift for the local oscillator is from 0.1 to 10 parts in 10^13. The quotient in this equation is the average, possibly a weighted average, of all transceivers in a consensus set. Typically, the consensus set for time base offset is the transponders in the range set for which an accurate time-of-flight can be determined, and from which their received messages are valid.

Convergence rate is controlled by the rate of performing the above computation, such as once per basic time interval, or another rate, such as two times per second, once per second, and the like. Convergence may also be rate limited by only allowing the new E0' to deviate from the prior E0 by a maximum time, such as one nanosecond per iteration, or 0.1, 0.2, 0.5, 1, 2, 5, 10, 25 ns, or another rate limit.

Desirable accuracy for the internal time base or the as-used time base may be 0.5 ns, 1 ns, 2 ns, 5 ns, 10 ns, 15 ns, 25 ns, 50 ns, or 100 ns.

An accurate time base has many uses, including both a check on and a direct measure of distance. It may be used to identify malfunctioning transceivers and hackers. Antennas should be placed in a consistent position, such as the center of the vehicle on the roof, or in the rear glass, and timing should be computed as of the center of the antenna. Note that the reference point for vehicle position is the center of the frontmost portion of the vehicle, so if the antenna is not at this location, suitable correction must be made in the computations.

Figure 6:
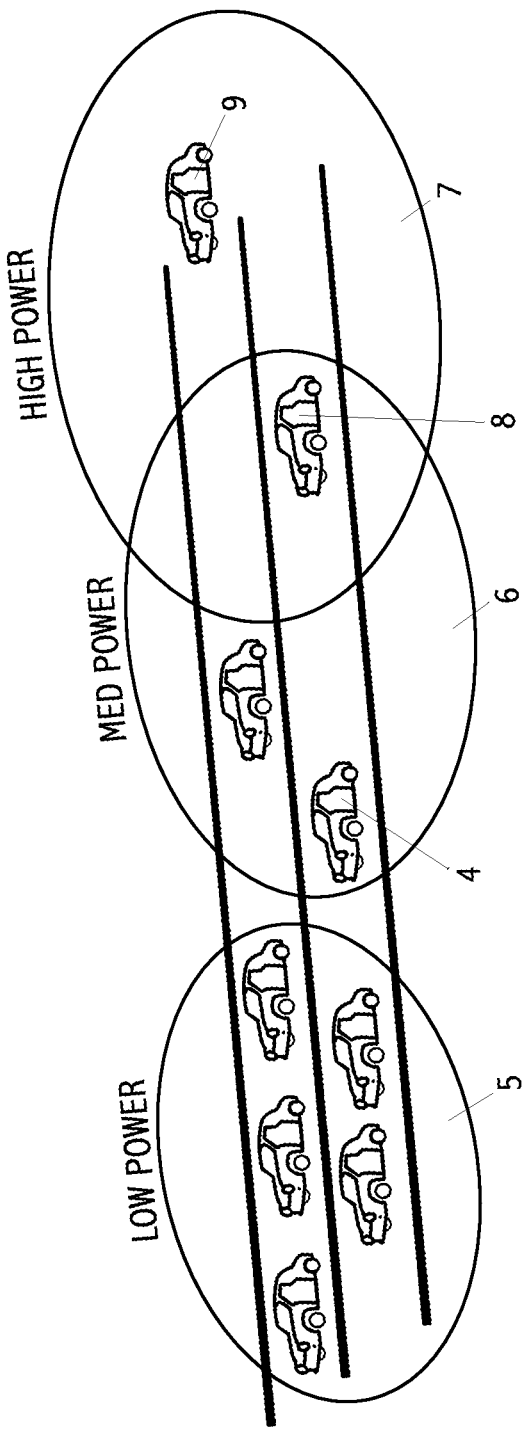
FIG. 6 shows an exemplary situation for different size consensus sets for transmit power level.

FIG. 6 shows three consensus sets for transmit power convergence. For transmit power convergence the convergence set is similar to, or identical to a valid range set. Consensus set 5, in the Figure, comprises vehicles closely spaced, and thus they operate at low power to keep the number of used time slots down. Consensus set 6 has vehicles moderately spaced, and thus operates at medium power. In consensus set 7 the vehicles are spaced far apart, and thus operate at high power to include an appropriate number of vehicles in the range set. A key attribute is that the consensus sets may overlap. Note that vehicle 8 is in both ellipses shown as 6 and 7. Its consensus set includes all or a subset of the vehicles in ellipses 6 and 7. Thus, it will operate at a power level between the average power of consensus sets 6 and 7. For example, vehicle 9 may be at power level 12, while vehicle 4 is at power level 8. Vehicle 8 may be at power level 10. The result of this embodiment is that power levels change smoothly from the low traffic density area 7 to the high density area 5.

Power levels may be updated by the consensus process once per frame, once per second, or at another frequency, such as in the ranges 0.1 to 180, 120, 60, 30, 15, 10, 5, 3, 2, or 1 second.

Convergence of transmit power should be rate limited so as to avoid oscillations and other instabilities. In one case, this averaging and convergence may be based on actual transmit power, however, in some cases it is necessary to "shout" to be heard, even if your message is to "be quieter." Thus, the power level that should be averaged is the "recommended" power level. In most cases the transmit power level and recommended power level are be the same, or close, such as one level apart. The preferred embodiment is that power levels are increased at the maximum rate of one step (out of 13 to 16) per basic time interval. Thus, typically, ramping up from minimum power to maximum power takes about 1.4 seconds, if the basic time interval is 0.1 s. Ramping power down should be quicker, at the rate of two steps per basic time interval, for example. If lower power is needed to maintain QoS, it is important that this be achieved quickly. However, vehicles in a high-power, approaching group should be informed by one or vehicles the approached low power group of their impending "ramp down," and a vehicle in the low power group may need more than the minimum power level to achieve this. Moderate ramp-down rate meets both needs.

In general, having all V2V transponders within range listen to recommended power levels every basic time interval and perform an averaging calculation and then adjustment of their own transmit and recommended power levels provides for rapid, ongoing convergence of an appropriate power level, even as the number of vehicles in a range changes continually, and vehicles are in multiple ranges. Consider a situation where, on a long road, at one end, a large number of vehicles are clumped together, perhaps waiting for traffic light with heavy cross traffic. At the other end of this long road, vehicles are spread out. There is a gradual shift in vehicle density from the high-density end of the road to the low-density end. Each vehicle is in a potentially unique range set and potentially unique consensus set, with some vehicles in that range closer to the low-density end and some vehicles in that range closer to the high-density end. At the high-density end, transmit power will be low, as vehicles are closely spaced and there are many. At the low-density end, transmit power will be high, as the vehicles are moving fast, there are few, and thus the vehicles desire information on relatively distant (and fast moving) other vehicle in range. Note that this novel embodiment provides for a gradient of transmit power from the low-density end of the road to the high-density end of the road. A vehicle in the middle notes that some vehicles in its range are using lower power, while other vehicles (going in the opposite direction) are using higher power. It averages these, placing its own power in the middle. The transceivers continually adjust their power as they move from one end of the road to the other. Thus, the power gradient may stay relatively constant even though vehicles are moving through the gradient in both directions.

Transceivers do not need to send a Signal Power sub-message every basic time interval. If the vehicles in range are largely agreed, already on an appropriate power level, there is no reason to transmit a message that says, in effect "I am still using the same power and so should you." This sub-message should be sent (a) at a low rate, such as once every two seconds; and (b) when power levels of transponders should be adjusted; and (c) when a transponder changes its own power level. Note that the recommended power level may change faster than the transmit power level. A recommended form for Signal Power sub-messages includes actual transmit power, recommended transmit power, and reason code for changing recommended transmit power from the current consensus. Signal Power sub-messages may be sent based on a necessary change, rather than only on a regular schedule.

Transceivers may implement "hysteresis," to avoid changing power levels too frequently. For example, they may require that the their "target" power level, as computed by the average of all received recommended power levels, be at least one full power level higher or lower than their current power level before changing their current transmit power level. Thus, they may be recommending a power level one level different than their own transmit power level for a while.

Fixed roadside transmitters operated by government entities do not have to implement dynamic power level changing, although some type of dynamic adjustment is recommended for most roadside transmitters. Also, they are permitted to consistently transmit at a higher power level than their recommended power level. In this mode they operate somewhat as "master power level police."

When a group of low-power transceivers meets a group of high-power transceivers, in general, there will be more low-power transceivers than high-power transceivers. Thus, there will be more messages containing "low power" in the power level fields than messages containing "high power" in the power level fields. Thus, typically, lower-power messages will tend to dominate in such averaging, when two disparate groups of vehicles merge towards forming a single range.

A transceiver is not obligated to send Signal Power sub-messages if it has higher priority sub-messages.

Signal Power sub-messages should generally be sent once every five seconds, if sent regularly or there is no significant change to recommended power level. If vehicles in range are seriously out of power level convergence, the rate may be increased to twice per second.

As in all other messages that are sent at regular intervals exceeding one basic time interval, V2V transceivers should choose an algorithm that spreads out these types of messages over time. One method is to randomly adjust the time interval up and down. Another method is to observe current transmissions and select a time that is not busy. Note that random delays in making such a decision should be used, to avoid system-level oscillations.

We define 14 power levels, although other embodiments may define more or less levels. At least 4 power levels are recommended.

For short V2V message, the overhead of individual transmissions is considerable. Therefore, the overhead should be minimized. One such overhead is the guard time between messages. The purpose of the guard time is prevent time-of-flight from causing two messages in two adjacent time slots from overlapping. The time-of-flight is the maximum operating distance of a range set divided by the speed of light. Appropriate operating distance in the range of 10 meters to 10 km. An ideal maximum operating range for the priority class region is 1 km, with 5 km being ideal for non-priority and emergency class regions. Time of flight for 1 km is 3.34 µs. If the maximum allowable time base error for a transponder is 0.250 µs, then 3.34+2*(0.25)=3.84 µs is the minimum guard time for a 1 km maximum operating range.

A range set for a first vehicle is a set of vehicles that are communicating with the first vehicle at any given time. The range set for the vehicles in a range set is typically not the same. Thus, range sets "overlap."

The primary purpose of priority class messages is to avoid or mitigate collisions. Thus, the effective range for the priority class need not be far. Purposes for the non-priority class and the emergency class vary. They may be used for travel information, toll and parking fee collection, data-base sharing (such as street history and lane maps), courtesy messages (such as, "your tail lights are out"), message forwarding, parking information, event information, traffic signal communication and optimization, traffic flow optimization, emergency management, and the like. Thus, a longer maximum operating range is appropriate, such as 1 km to 100 km. One such range is 5 km. Thus, the inter-frame gap time may vary between class regions. The inter-frame gap time may be fixed or dynamic. Consensus may be used to arrive at an agreed dynamic maximum range for a range set.

All transponders participate in identifying message collisions, including the transmitting transponder. This is why converging on transmit power within a range set is important. Those trained in the art know there are multiple ways of detecting a message collision, such as high signal strength with an invalid preamble, FCS or modulation; or the signal/noise ratio in a given time slot suddenly increases. A message collision notification message is typically broadcast in the transponder's priority class region time slot. However, it may be transmitted in the non-priority class region. Also, a transponder may select a new, second time slot for the purpose of sending a message collision notification message, however this is normally done only if it appears that the first such message or messages were not received by at least one of the sources of the message collision. Message collision notifications should be sent as soon as possible when a message collision is detected. In an alternative embodiment, two consecutive message collisions must be detected before a message collision notification message is sent. This alternative allows at least one of the sources of the message collision to self-detect the collision and select a new time slot without using up any bandwidth for message collision notifications.

Vehicle location is always the location of the vehicle (the vehicle's reference point) at the end of the frame in which the message is sent. (In some embodiment, another fixed time relative to the same frame.) Thus, for a moving vehicle, the vehicle position and therefore the vehicle identification in a message changes. The vehicle position need only be within an allowable error for the vehicle to be clearly and consistently identified. One such method uses the "closest vehicle" (closest reference point on the vehicles) to the position in the message. Another message uses a maximum allowable distance, which may vary with vehicle speed, or other factors. A range of such allowable distance is 100 cm to 10 meters, with 1 or 2 meters being a good choice.

There is a necessity for some vehicle elevation information to be present in the system. If all two-axis locations or positions were merely projected on to a surface of the earth then on a non-grade-level crossing, such as an overpass, the vehicles would appear to be passing through each other. A V2V system must be able to distinguish grade-separated traffic from grade-level traffic. This applies to train, bicycle and pedestrian overpasses and underpasses, as well as vehicle grade-separations.

There are two specifically defined embodiments herein that address this issue. The first is to regularly broadcast elevation, like position, only less frequently. The recommended time for an elevation message is in the range of interval is 500 ms to 15 s, with 1 second being a good choice. Elevation messages may be only sent when elevation of the vehicle or the lane changes more than a predetermined amount. The preferred format for this message is to provide a signed 10-bit number that represents the elevation of the transportation surface (e.g. street or path) in units of 10 cm from the nearest 100 m interval above mean sea level, using the same geodetic system as for location. Thus, this number has a range of −51.2 to +51.1 meters. One or more bits may be used to indicate a sudden, rather than a smooth, elevation change, such as a curb, speed hump, or pothole.

A preferred embodiment is for vehicles to use a "consensus based" averaging for elevation, done by averaging elevation errors from an internal baseline elevation, similar to the consensus based averaging use to achieve consistent position coordinates. Each transponder in the consensus set averages a zero offset from its own best computation of "true" or "baseline" elevation with the received elevation offsets of the other vehicles in the range set (corrected for detected relative elevation differences in the surface), then uses this average in future transmissions (again, adjusted for changes in the surface since the point of the average determination). Vehicles should minimize the rate of change of elevation broadcasts due to consensus adjustments to avoid an artifact of apparent climbing or descending. The preferred maximum rate of elevation change due to such consensus adjustments is 0.1 m/s/s.

Transponders may send elevation sub-messages more frequently when the elevation of the road surface changes.

Vehicles should use an accelerometer, inclinometer, or other inertial navigation sensors to maintain a smooth continuum of "true" elevation changes while moving.

Note that the preferred embodiment for elevation is sufficient to indicate curbs, potholes, speed bumps, and other permanent, temporary, intentional or accidental variations in surface height. For the purposes of safety, high precision (say, 1 cm) in not necessary in representing these objects, only that that exist. Thus, identifying an object (by type, such as curb, pothole or speed bump), or simply as a lane discontinuity, using described data formats for either vehicle height or lane elevation, is supported in the described embodiments. For example, if a vehicle hits a pothole (recognizing that the pothole is most likely under a wheel, not in the center of the lane), it might choose to broadcast three elevation messages in succession (say, 0.1 s apart) indicating the effective elevation change. Even with a single bit change (10 cm) receipt of such a message sequence is a clear indication of the object.

Relative elevation of other vehicles may be determined by "seeing" the vehicle, such as with a vision system or other on-boards sensors. This is necessary to obtain the "remote as-used value" of the elevation parameter or elevation error parameter. Another way to determine relative elevation is by the use of lane record that describes the slope of a lane. Knowing the relative location of another vehicle on the same lane (such as by the vehicle's position data broadcast), and the slope of the lane, it is easy to determine the relative elevation of the second vehicle to the first vehicle, even if the vehicle is not "visible." The first and second vehicles do not need to be in the same lane, so long as the two lanes are linked by lane records that include sufficient elevation data and accuracy.

Similarly, as a pedestrian steps off of a curb, a mobile device (a smart phone, using, for example, its internal accelerometer) could broadcast that elevation change, allowing V2V equipped vehicles (and mobile electronic devices receiving V2V messages) to record an accurate location of the curb. In this way, "curb maps" could be created easily, without the need for a government entity or third party to create and distribute such a database.

Note that the "once per second" transmission rate (or other predetermined rate) should have some dither imposed on the time interval, or at randomly selected initial transmission time (within the one second window), so that such elevation messages are spread out in time.

Note that vehicles may generate their own, internal, stored, set of non-grade-level crossings, in a minimal case, by observing that a number of vehicles appear (using surface of the earth locations) to be passing through each other.

Determination of relative position, speed and heading is typically accomplished with sensors such as cameras, sonar, radar and LIDAR, mounted on the same vehicle as the transponder. In many cases, such sensors are used for other purposes, such as backup warnings or self-park sensors. Often, a vehicle will be able to proxy a vehicle directly in front, behind, to the left, to the right, and often four or more "diagonal" vehicles that are line-of-sight. A vehicle in stopped first in line at a stop sign or traffic light may be able to proxy a large number of vehicles that are first or second in line at other points in the intersection, as well as most vehicles passing through the intersection. On two lane roads, a vehicle will often be able to proxy an oncoming vehicle.

It is desirable that all vehicles in a range set have a common time base with a minimum amount of error. An internal clock or GPS-derived clock may not be adequate for this purpose. In one embodiment consensus is used to arrive at a (nearly) common time base for a consensus set. Each time slot message should begin at precisely the start of the time slots. Time-of-flight may be corrected because the transmitter's location is usually known. Thus, each receiver can compute the apparent time base error for all valid TDMA messages received. Each receiver may then average all such apparent time base errors, including a zero offset from its own baseline time base (which may be weighted to count as more than one in the averaging), and shift its "as-used" time base by that, consensus based error. Since each transponder includes its own internal time base (which may be a combination of GPS or other satellite system derived time base and a precision internal clock) in the averaging, the consensus time base will also converge towards the average of all internal time bases in the consensus set. Since consensus sets typically overlap, the time base error used in transmitting by each vehicle is likely to be very slightly different. Invalid messages, and messages where the vehicle location or time-of-flight cannot be accurately determined are not used in the averaging process. Messages with an excessive amount of apparent time base error are considered invalid for this purpose. Ideally, the time base correction is performed at the end of every frame, although it may be performed on a different schedule, or only under certain conditions. Time base correction should limited to a maximum rate of change. A transponder without a sufficiently accurate internal clock should not transmit, although listening is typically still valuable. A suitable accuracy is in the range of 1 ns to 4 μs, with 0.250 μs being a good desired minimum accuracy. If the time base is going to be used to compute distance, then a desired accuracy is in the range of 0.1 to 2 ns, with 0.3 ns being a good choice.

The meaning of the term "message" includes "sub-message." A "consensus group" is a group of transponders participating in a convergent algorithm using the V2V messages of embodiments of this invention.

Suitable buffer zone sizes may be 10, 20, 50, 100, 125, 150, 200, 250, or 300 time slots. Suitable buffer zone sizes are 10%, 15%, 20%, 40%, 50%, 75%, 100%, or 200% of a current priority or emergency class region size. Buffer zone sizes may be a combination of a numerical time slot count and a percentage of an class region size, such as the larger of 50 time slots or 50% of current class region size, subject the limit of all time slots. Buffer zone size may be fixed or variable.

Embodiments and possible limitations include: A minimum number of time slots of 50, 100, 150, 200, 250, 500, 1000, 2000; A minimum number of time slots for vehicle safety messages comprising (i) vehicle position, (ii) vehicle speed, and (iii) vehicle heading are 15, 50, 100, 150, 200, 250, 500, 1000, or 2000; A minimum number of time slots for vehicle safety messages comprising (i) vehicle position, (ii) vehicle speed, (iii) vehicle heading, and (iv) vehicle identification suitable for V2V potential collision warnings are 15, 50, 100, 150, 200, 250, 500, 1000, or 2000; A minimum number of time slots for vehicle safety messages dedicated to being transmitted by a combination of emergency vehicles and government authorized road-side units are 10, 25, 50, 100, 150, 200, 250, or 500; A maximum time for the basic time interval is 2, 1, 0.5, 0.25, 0.1, 0.05, or 0.01 seconds; A minimum transmit rate for V2V safety messages or messages suitable for V2V potential collision warnings is 1, 2, 5, 7.5, 10, 15, or 20 times per second; A maximum message length for data, exclusive of: wireless header, preamble, signal field, frame check sum, and inter-frame guard time is 114 bits, 282 bits, 36 bytes, 50 bytes, 75 bytes, 100 bytes, 150 bytes, 200 bytes, 250 bytes; A maximum message length for data, exclusive of: wireless header, preamble, signal field, frame check sum, and inter-frame guard time but inclusive of any MAC or IPS address, if any, is 114 bits, 282 bits, 36 bytes, 50 bytes, 75 bytes, 100 bytes, 150 bytes, 200 bytes, 250 bytes; A maximum time of an inter-frame guard time of 1, 2, 3, 4, 5, 7.5 10, 15, 20, 25, 50 microseconds; An inter-frame guard time computed by maximum intended range of single-hop V2V communications divided by the speed of light, plus two times the allowable common time base error; A maximum intended range of single-hop V2V communications of 50, 100, 250, 500, 750, 1000, 1500, 2000, 2500, 5000, or 10000 meters; A minimum number of vehicles that may simultaneously use a V2V communications system with 90%, 95%, 99%, 99.5%, 99.9% or 99.99% reliability is 10, 25, 50, 75, 100, 150, 200, 250, 350, 500, 750, or 1000; A minimum number of time slots reserved for land vehicle use; A transceiver, for each subject vehicle, transmits a vehicle safety message or a V2V message suitable for collision prevention no more than once per basic time interval, in at least 90% of all basic time intervals; Each non-forwarded safety message comprising a subject vehicle position is unique for the basic time interval in which it is broadcast; Each safety message is updated for each basic time interval in which it is broadcast; Each safety message comprises data that is to be interpreted as valid precisely at the end of the basic time interval in which it is broadcast; V2V system incorporating transponders of this invention are free of roadside units (RSU's); V2V system incorporating transponders of this invention are free of the necessity for any fixed infrastructure, such as servers, cell towers, or RSUs; All time slots are available for use by mobile transponders. Such limitations or features of this paragraph may be in any combination. A preferred embodiment is a basic time interval of 0.1 seconds comprising 1000 time slots with an intended range of 1000 meters comprising V2V safety messages of 114 data bits and 282 data bits, supporting a minimum number of time slots reserved for a combination of emergency vehicle and government provided RSU use.

A phrase is used in one embodiment: "the transponder broadcasts a V2V safety message in one self-selected time slot in the priority class region in every frame." The term, "self-selected" is discussed and described in more detail elsewhere herein. The time slot number is not provided by any central authority. In certain cases, such as a proxy hand-off, the transponder may choose to use a prior-used time slot for the proxy vehicle. The term, "in every frame" means while the transponder is operating in this particular embodiment. Not transmitting in every frame due to: (i) equipment initialization, self-test, or shutdown; (ii) another operating mode, such as parking-lot mode; (iii) changing time slots; or (iv) unusual, slave or emergency operation; infrequent non-transmission as an attempt to circumvent patent rights are all within the claimed definition of the claimed embodiment. An emergency vehicle may switch from or to transmitting in every frame in the emergency class region, instead of the priority class region, and such operation is within the claimed definition of the claimed embodiment. The term "one time slot" means that the V2V safety message occupies one time slot. The transponder is free to use additional time slots in the same frame, as appropriate, for different (or duplicate) V2V safety messages.

The term "subset" of a set may include all. If a transponder potentially or originally in a consensus set does not provide or is not able to provide data usable for the transponder to compute the desired parameter as-used value, that vehicle is removed from the consensus set.

The phrase, "incorporate the new as-used value in one or more V2V safety message broadcasts" includes using the as-used value to compute or alter transmitted position, heading or speed, and includes using the as-used value to set or alter a transmitted or requested transmit power level, and adjusting or offsetting a time base.

When the parameter is "location," the location may be a scalar or a vector. The axis for the location may not be aligned with N-S or E-W; for example, it may be the road axis, or perpendicular to the road axis. Thus, censuses based location or relative position may compute two axis separate, using different consensus sets and different criteria for including vehicles in the consensus set. If location is a vector, then k is a vector. In this case, the term "number" includes "vector." If k is zero, then the transponders' baseline values are not used, and convergence will be entirely based on the vehicles in the consensus set. If k is one, the vehicle's baseline value is included in the converged values. If k is more than one, convergence will be slower. If k is between 0 and 1, convergence will be faster, and the baseline values will have less effect on the converged values. k equal to one is a suitable choice, at least as an initial value for k, subject to improvements and dynamic changes to k.

The "location" as a parameter is not the geographic location, nor the "offset" location from a grid point as broadcast in a V2V safety message, but rather a location already corrected based on the broadcast V2V safety data, so that it is relative to a reference point, such as the reference point of the first vehicle. For example, the first vehicle considers its parameter location to be "zero." Based on the V2V safety message position data from a second vehicle, that vehicle purports to be 30.00 meters in front of first vehicle. However, a radar on the first vehicle indicates that the second vehicle is 29.00 meters in front of the first vehicle. Thus, the computed remote as-used location for the second vehicle is 1.00 meters, because it has an effective location error (relative to the reference points on the vehicles) of +1.00 meter. Averaging the baseline value of zero with the as-used value of the second vehicle of +1.00, assuming k=1 in this case, produces a new as-used value for the first vehicle of +0.50 meter. If the second vehicle performs the same calculation, assuming it determines the vehicle spacing is also 29.00 meters, it will also produce a new as-used value of −0.50 meter. When both the first and second vehicle next broadcast their vehicle positions, they include their as-used values in their broadcast vehicles positions. The first vehicle will broadcast a position 0.50 meters more forward to the second vehicle and the second vehicle will broadcast a position 0.50 meters more backwards, and their broadcast positions will now indicate a 29.00 meter spacing, which is the actual vehicle spacing. This scenario works the same if the vehicles are moving or stopped, and works for a second axis.

A baseline value may be zero. A baseline value may be incorporated into the as-used value, rather than being a separate variable.

For convergence for a parameter, the "as-used" value may be the value of an actual parameter, such as a transmit power level, or may be an offset or error from a baseline value, such as a time base. If the as-used value is an offset or error, we want convergence eventually and optimally towards zero. In this case, the baseline value is typically zero. If the as-used value is the actual parameter, we want convergence towards the baseline of that parameter. In this case the baseline value is typically the "best possible computation" of that value, by the transponder, without consideration of other transponders.

Suitable rate of change limitations for location are in the range of 0.02 m/s/s to infinite m/s/s, or 0.1 m/s/s to 10 m/s/s, or 0.2 m/s/s to 2 m/s/s. A good choice is 0.5 m/s/s.

In the formula:

$$E0(new)=[(k*E0+sum(Ex) \text{ for all } x \text{ in the consensus set})/(k+M+U)],$$

where M is the number of vehicles in the consensus set, k is a convergence factor, U is a factor to encourage convergence towards zero, E0(new) is the new as-used value, E0 is the as-used value (now the previous as-used value); and E0 is initially set to the baseline value, k may be in the range of 0 to 1, 0.1 to 1, greater than 1, or 1; U may be 0, 1, or in the range of 0 to 1. Ex are the remote as-used parameter values, where x is from 1 to M.

In some embodiments each vehicle includes itself in the consensus set.

The embodiments and scenarios are described herein are non-limiting. As those trained in the art appreciate, there are many alternative and equivalent embodiments of this invention. Small variations from absolutes, constants, and limits, such as "all," "always," or "one," that have a minimal effect on the purpose of the invention, are within the scope of the claims. A "minimal effect" may be defined as one that reduces the desired effectiveness by 5% or less.

An embodiment uses 14 power levels, and both the actual transmit power level and recommended power level fields are 4-bits each. At least 4 power levels are recommended. Other embodiments use 5-bit, 6-bit, 8-bit or 10-bit fields, with a corresponding number of levels. Ideally, values for 0 and the maximum value the field can hold are reserved, to be use for testing, or to mean "not provided in message." Transmit power levels should be rate limited. One embodiment limits rate change to one step per frame. A change from lowest power to highest power might take 1, 2, 3, 4, 5, 8 or 10 seconds. In some embodiments, the rate limit for ramp down is faster than for ramp up. There are exceptions to the consensus power level. Certain messages may need a longer range or have a higher priority of being received correctly. Forwarded messages may be sent at a higher power. Inconsistent power levels in a range set may cause message collisions, unrecognized message collisions or network instability. Emergency messages may be sent at higher power than other class regions because the desired V2V communication range for the emergency class region time slots is larger.

One embodiment uses targets of 250 meter range and 150 vehicles. Power is increased or decreased to reach the lower of the two targets. Another embodiment has targets of 1 km range and 250 vehicles. Targets for parking lots and parking lot operating modes may be different. A predetermined range threshold may be in the range of 100 to 1000 meters. The predetermined priority usage threshold maybe in the range of 10 to 250 non-empty time slots.

Time base convergence may be recomputed each frame time. In this way, all vehicles in a range set will rapidly converge to a common time base, even as the range sets themselves constantly change. Note that the averaging algorithm is not for the purpose of improving accuracy, but rather for the purpose of achieving convergence, and thus time base consistency, within a range set.

By including its own current time base in the computational average, there will be no oscillation or instability in the convergence. By including received GPS or another satellite navigation system time, all transceivers will also converge in the average of all received GPS times. By GPS time, we meet UTC as communicated via GPS or other system. Government authorized road-side units (RSUs) may or may not participate in convergence. If not, they will be treated as a "reference" time base and should be extremely accurate, since all vehicles within range of the RSU will converge to its time base.

Only valid received messages are used in the computation. A message whose time base is outside of a reasonable range is not valid. Thus, a hacker will not be able to "pull" a time base because he will be simply outnumbered.

A key feature is to use the known distance of each transceiver to "correct" its time base due to time of flight of the message. This is true for non-reflected transmissions; and less true, although possibly true of reflected transmissions. Ideally, a receiver should know if a received message is reflected or not. If a receiver is not sure, the message may be treated as invalid for the purpose of time base correction.

A key feature is the use of the messages themselves for time base extraction. Each message is transmitted highly precisely at the beginning of its time slot. The long training and short training 32 μs preamble is a precise, known transmission, and thus may be used with high precision to determine transmit time. Also, the SIGNAL field, 8 μs, may be used for this purpose. Signal correlators at the carrier or sub-carrier frequencies, or at a demodulator, using a DSP for computation, are appropriate and well known in the art. These messages provide synchronization to the time slot length, 100 μs. Internal clocks should be within half this time, as will a GPS signal. A message collision notification or a time-stamp message, or another message may be used to verify that the start of the basic time interval is correct.

Convergence rate is controlled by the rate of performing the above computation, such as once per basic time interval, or another rate, such as two times per second, once per second, and the like. Convergence may also be rate limited by only allowing the new E0' to deviate from the prior E0 by a maximum time, such as one nanosecond per iteration, or 0.1, 0.2, 0.5, 1, 2, 5, 10, 25 ns, or another rate limit.

Desirable accuracy, t1, may be 0.5 ns, 1 ns, 2 ns, 5 ns, 10 ns, 15 ns, 25 ns, 50 ns, or 100 ns.

An accurate time base has many uses, including both a check on and a direct measure of distance. It may be used to identify malfunctioning transceivers and hackers. Antennas should be placed in a consistent position, such as the center of the vehicle on the roof, and timing should be computed as of the center of the antenna. Note that the reference point for vehicle position is the center of the front-most portion of the vehicle, so if the antenna is not at this location, suitable correction must be made in the computations.

An RSU may have a calibrated elevation. By not executing a consensus algorithm itself, the RSU will tend to drive all transponder's elevation errors towards zero, for all transponders within range. These transponders will then, in turn, tend to drive other transponders within their range towards zero elevation error. Thus a small number of calibrated RSUs will cause a large number of vehicles over a wide area to have minimal elevation errors. The reference point for a vehicle is always the grade level for that vehicle (at front, center, for example). Thus elevation consensus causes agreement among a consensus set on grade levels. Elevation consensus may be used to generate accurate lane maps internally within the mobile V2V system, which, in turn, provide for more accurate elevation consensus.

The meaning of the term "message" includes "sub-message." A "consensus group" is a group of transponders participating in a convergent algorithm using the V2V messages of embodiments of this invention.

Suitable buffer zone sizes may be 10, 20, 50, 100, 125, 150, 200, 250, or 300 time slots. Suitable buffer zone sizes are 10%, 15%, 20%, 40%, 50%, 75%, 100%, or 200% of a current priority or emergency class region size. Buffer zone sizes may be a combination of a numerical time slot count and a percentage of an class region size, such as the larger of 50 time slots or 50% of current class region size, subject the limit of all time slots. Buffer zone size may be fixed or variable.

Embodiments and possible limitations include: A minimum number of time slots of 50, 100, 150, 200, 250, 500, 1000, 2000; A minimum number of time slots for vehicle safety messages comprising (i) vehicle position, (ii) vehicle speed, and (iii) vehicle heading are 15, 50, 100, 150, 200, 250, 500, 1000, or 2000; A minimum number of time slots for vehicle safety messages comprising (i) vehicle position, (ii) vehicle speed, (iii) vehicle heading, and (iv) vehicle identification suitable for V2V potential collision warnings are 15, 50, 100, 150, 200, 250, 500, 1000, or 2000; A minimum number of time slots for vehicle safety messages dedicated to being transmitted by a combination of emergency vehicles and government authorized road-side units are 10, 25, 50, 100, 150, 200, 250, or 500; A maximum time for the basic time interval is 2, 1, 0.5, 0.25, 0.1, 0.05, or 0.01 seconds; A minimum transmit rate for V2V safety messages or messages suitable for V2V potential collision warnings is 1, 2, 5, 7.5, 10, 15, or 20 times per second; A maximum message length for data, exclusive of: wireless header, preamble, signal field, frame check sum, and inter-transmission guard time is 114 bits, 282 bits, 36 bytes, 50 bytes, 75 bytes, 100 bytes, 150 bytes, 200 bytes, 250 bytes; A maximum message length for data, exclusive of: wireless header, preamble, signal field, frame check sum, and inter-transmission guard time but inclusive of any MAC or IPS address, if any, is 114 bits, 282 bits, 36 bytes, 50 bytes, 75 bytes, 100 bytes, 150 bytes, 200 bytes, 250 bytes; A maximum time of an inter-transmission guard time of 1, 2, 3, 4, 5, 7.5 10, 15, 20, 25, 50 microseconds; An inter-transmission guard time computed by maximum intended range of single-hop V2V communications divided by the speed of light, plus two times the allowable common time base error; A maximum intended range of single-hop V2V communications of 50, 100, 250, 500, 750, 1000, 1500, 2000, 2500, 5000, or 10000 meters; A minimum number of vehicles that may simultaneously use a V2V communications system with 90%, 95%, 99%, 99.5%, 99.9% or 99.99% reliability is 10, 25, 50, 75, 100, 150, 200, 250, 350, 500, 750, or 1000; A minimum number of time slots reserved for land vehicle use; A transceiver, for each subject vehicle, transmits a vehicle safety message or a V2V message suitable for collision prevention no more than once per basic time interval, in at least 90% of all basic time intervals; Each non-forwarded safety message comprising a subject vehicle position is unique for the basic time interval in which it is broadcast; Each safety message is updated for each basic time interval in which it is broadcast; Each safety message comprises data that is to be interpreted as valid precisely at the end of the basic time interval in which it is broadcast; V2V system incorporating transponders of this invention are free of road-side units (RSU's); V2V system incorporating transponders of this invention are free of the necessity for any fixed infrastructure, such as servers, cell towers, or RSUs; All time slots are available for use by mobile transponders. Such limitations or features of this paragraph may be in any combination. A preferred embodiment is a basic time interval of 0.1 seconds comprising 1000 time slots with an intended range of 1000 meters comprising V2V safety messages of 114 data bits and 282 data bits, supporting a minimum number of time slots reserved for a combination of emergency vehicle and government provided RSU use.

A functioning V2V system requires at least two transponders. Because of proxying, such a V2V system using the transponders of these embodiments is effective with as little as 10% penetration. Penetration is the percent of vehicles in a defined region or class that are equipped. A "subject vehicle" is the vehicle whose data is in a message. The "host vehicle" is the vehicle in which the transponder is located. Proxying is when the subject vehicle is not the host vehicle.

The embodiments and scenarios are described herein are non-limiting. As those trained in the art appreciate, there are many alternative and equivalent embodiments of this invention. Small variations from absolutes, constants, and limits, such as "all," "always," or "one," that have a minimal effect on the purpose of the invention, are within the scope of the claims. A "minimal effect" may be defined as one that reduces the desired effectiveness by 5% or less.

Applications to which this application claims priority are incorporated herein. The terms "position" and "location" may be used interchangeably. Embodiments of this invention include all possible combinations of all limitations, options, features, and ranges disclosed herein, including in the claims and drawings. "vehicles in range" and "time slots in use" as a Markush group.

What is claimed is:

1. A vehicle-to-vehicle (V2V) communication transponder, comprising a processor and a radio, configured to operate in a first vehicle wherein the transponder is configured to accept as input a first location of the first vehicle and a vehicle heading of the first vehicle, and wherein the radio is configured to broadcast a series of V2V safety messages wherein a majority of V2V safety messages comprise: (i) the first vehicle position; (ii) the first vehicle heading; and (iii) a first vehicle speed; wherein the improvement is:
the processor uses a basic time interval ("frame") of predetermined duration wherein the frame repeats continuously;
wherein the frame comprises n time slots of predetermined duration, enumerated and contiguous;
wherein the frame is subdivided into a priority class region comprising contiguous time slots from a first time slot S1 to a last time slot S2; and
a non-priority class region comprising contiguous time slots from a first time slot S3 to a last time slot S4;
wherein the range S1 to S2 and the range S3 to S4 do not overlap;
wherein the radio transmits only time-critical V2V safety messages in the priority class region;
wherein the radio broadcasts a V2V safety message in one self-selected time slot in the priority class region in every frame;
wherein the transponder comprises a parameter, a baseline value for the parameter, and an as-used value for the parameter;
wherein the processor determines a subset of one or more vehicles within communication range, the "consensus set";
wherein the processor computes, for each vehicle in the consensus set, a remote as-used value for the parameter for each vehicle;
wherein the processor computes a new as-used value for the parameter responsive to the remote as-used values, the baseline value, and previous as-used value:
wherein the processor incorporates the new as-used value in one or more V2V safety message broadcasts;
wherein the baseline value of the parameter is not responsive to the remote as-used values;
wherein the processor repeats the steps of determining a baseline value, determining a consensus set, computing a remote as-used value for each vehicle in the consensus set, and computing a new as-used value repetitively;
wherein at least one other transponder in the consensus set performs the same steps of determining their consensus set; computing a remote as-used value for each vehicle in their consensus set, and computing a new as-used value repetitively; and
wherein the consensus sets for vehicles in the consensus set may not be the same.

2. The vehicle-to-vehicle (V2V) communication transponder of claim 1 wherein:
the consensus set comprises vehicles for which the transponder obtains, for each vehicle in the consensus set, a "relative position" to the first vehicle in at least one axis, separate from vehicle position data in a V2V safety message from the each vehicle;
wherein the parameter is a "location offset" for the at least one axis;
wherein the baseline value of the parameter is a zero offset from the location of the first vehicle; and
wherein the as-used value for the location offset is used to compute the broadcast vehicle position for the first vehicle.

3. The vehicle-to-vehicle (V2V) communication transponder of claim 2 wherein:
the computation of the as-used value for the location offset comprises averaging: the remote as-used values for the location offsets in the consensus set plus k times the previous as-used value for location offset for the at least one axis wherein k is a non-negative number.

4. The vehicle-to-vehicle (V2V) communication transponder of claim 2 wherein:
the at least one axis is either a road axis on which the first vehicle is traveling or an axis perpendicular to the road axis on which the first vehicle is travelling.

5. The vehicle-to-vehicle (V2V) communication transponder of claim 1 wherein:
the consensus set comprises vehicles for which the transponder obtains, for each vehicle in the consensus set, a "relative position" to the first vehicle in at least one axis, separate from vehicle position data in a V2V safety message from the each vehicle;
wherein for each vehicle in the consensus set, the obtained relative position must be within a "relative position accuracy threshold" for the each vehicle;
wherein the parameter is a "location offset" for the at least one axis;
wherein the baseline value of the parameter is a zero offset from the location of the first vehicle; and
wherein the as-used value for the location offset is used to compute the broadcast vehicle position for the first vehicle.

6. The vehicle-to-vehicle (V2V) communication transponder of claim 5 wherein:
the relative position accuracy threshold is the absolute value of the current remote as-used value of the each vehicle.

7. The vehicle-to-vehicle (V2V) communication transponder of claim 1 wherein:
the rate of increase of the new as-used value is rate limited by a previously determined rate increase limiting constant; and
the rate of decrease of the new as-used value is rate limited by a previously determined rate decrease limiting constant.

8. The vehicle-to-vehicle (V2V) communication transponder of claim 1 wherein:
a formula for computing the new as-used value is:

$$E0(\text{new}) = [(k*E0 + \text{sum}(Ex) \text{ for all } x \text{ in the consensus set})/(k+M+U)],$$

where M is the number of vehicles in the consensus set, k is a convergence factor, U is a factor to encourage convergence towards zero, E0(new) is the new as-used value, E0 is the previous as-used value, Ex are the remote as-used values; and
E0 is initially set to the baseline value.

9. The vehicle-to-vehicle (V2V) communication transponder of claim 1 wherein:
wherein the radio is configured to transmit at one of a plurality of numbered power levels;
wherein the radio is configured to broadcast a power-level message comprising a power level number;

wherein the consensus set is vehicles within a desired V2V communication range broadcasting validly received power-level messages;

wherein the parameter is a power level number of the transponder;

wherein the baseline value is a computed power level responsive to a desired V2V communication range and responsive to a desired number of vehicles within communication range; and wherein the as-used value is one of a set of possible power level numbers.

10. The vehicle-to-vehicle (V2V) communication transponder of claim 9 wherein:

the radio is further configured to broadcast a power-level message comprising a first value representing the current transmit power of the transponder and a second value representing a recommended transmit power level of transponders within a desired V2V communication range;

wherein the as-used value is the computed baseline value; and wherein the parameter is the second value representing a recommended transmit power.

11. The vehicle-to-vehicle (V2V) communication transponder of claim 10 wherein:

the remote as-used values are the values in received power-level messages representing a recommended transmit power level.

12. The vehicle-to-vehicle (V2V) communication transponder of claim 9 wherein:

the baseline value is continually adjusted upward when the communication range of vehicles transmitting messages received as valid is below a predetermined range threshold; and wherein baseline value is continually adjusted downward when the number of non-empty time slots in the priority class region is above a predetermined priority usage threshold.

13. The vehicle-to-vehicle (V2V) communication transponder of claim 9 wherein:

the power-level messages transmitted in the priority class region by a transponder are different than the power-level messages transmitted in the non-priority class region by the transponder.

14. The vehicle-to-vehicle (V2V) communication transponder of claim 1 wherein:

the transponder comprises an internal time base;

wherein the parameter is a time base offset;

wherein the transponder comprises an as-used time comprised of adding the as-used value for the time base offset to the internal time base;

the frame and time slots are synchronized to the as-used time base within an accuracy of t1 seconds;

wherein the consensus set is the set of transponders broadcasting V2V safety message reliably and validly received by the first vehicle;

wherein the baseline value is a zero offset from the internal time base; and wherein the computed remote as-used value for each vehicle is computed responsive to the difference in time between a received message from the each vehicle and the time the first vehicle would have sent the same message type and modulation in the same time slot, correcting for the time-of-flight of the received message based on the distance between the each vehicle and the first vehicle.

15. The vehicle-to-vehicle (V2V) communication transponder of claim 14 wherein:

a formula for computing the new as-used value is:

$E0(\text{new}) = [(k*E0 + \text{sum}(Ex) \text{ for all } x \text{ in the consensus set})/(k+M+U)]$, where M is the number of vehicles in the consensus set, k is a convergence factor, U is a factor to encourage convergence towards zero, E0(new) is the new as-used value, E0 is the as-used value (now the previous as-used value), Ex are the remote as-used values;

E0 is initially set to the baseline value; and

U is greater than zero.

16. The vehicle-to-vehicle (V2V) communication transponder of claim 1 wherein:

the consensus set comprises vehicles for which the transponder obtains, for each vehicle in the consensus set, a "relative elevation" compared to the first vehicle, separate from any elevation data in a V2V safety message from the each vehicle;

wherein the parameter is an elevation offset;

wherein the as-used value for the elevation is an offset from a baseline elevation; and wherein the baseline elevation is computed non-responsive to received elevation messages from other transponders.

17. A vehicle equipped with a transponder of claim 1.

18. A method of reaching consensus on a parameter in a V2V safety system wherein a first V2V transponder, comprising a processor and a radio, performs the steps of:

selecting a parameter;

computing an initial as-used value for the parameter from a baseline value for the parameter;

determining, from a set of V2V transponders broadcasting V2V safety messages reliably received by the first transponder, a "consensus set";

computing for each transponder in the consensus set a remote as-used parameter value for the each transponder;

computing a new as-used parameter value responsive to: (i) the remote as-used parameter values for each transponder in the consensus set, and (ii) a previous as-used value;

incorporating the new as-used parameter value in one or more V2V safety message broadcasts;

setting the previous as-used parameter value to the new as-used parameter value;

repeating the above five steps continually;

wherein the consensus set transponders perform the same above steps for the same parameter;

wherein the consensus sets of the transponders in the consensus set may not be the same;

wherein the first transponder is configured to operate in a first vehicle; and wherein the transponder is configured to accept as input a first location of the first vehicle and a vehicle heading of the first vehicle, and wherein the transponder is configured to broadcast a series of V2V safety messages wherein a majority of V2V safety messages comprise: (i) the first vehicle position; (ii) the first vehicle heading; and (iii) a first vehicle speed.

* * * * *